United States Patent [19]
Wadell

[11] Patent Number: 5,248,511
[45] Date of Patent: Sep. 28, 1993

[54] FOODSTUFF COATING PROCESS

[75] Inventor: Lars G. A. Wadell, Aengelholm, Sweden

[73] Assignee: Nestec S.A., Vevey, Switzerland

[21] Appl. No.: 726,753

[22] Filed: Jul. 8, 1991

[30] Foreign Application Priority Data

Aug. 23, 1990 [EP] European Pat. Off. ........ 90116121.6

[51] Int. Cl.⁵ .............................................. A23B 4/10
[52] U.S. Cl. .................................... 426/289; 426/273
[58] Field of Search ............... 426/289, 290, 296, 273; 118/13, 16, 22, 23, 24, 610, 305, 308, 324; 209/234, 243, 261, 307, 264, 922, 309; 401/200; 99/494, 488, 489, 345

[56] References Cited

U.S. PATENT DOCUMENTS

| | | | |
|---|---|---|---|
| 1,070,984 | 8/1913 | Pike et al. | 209/243 |
| 1,985,238 | 12/1934 | Brogden | 426/289 |
| 3,241,671 | 3/1966 | Brauchla | 209/243 |
| 3,316,977 | 5/1967 | Snook | 209/307 |
| 3,703,382 | 11/1972 | Harkey | 118/16 |
| 4,177,900 | 12/1979 | Kluthe | 209/261 |
| 5,078,090 | 1/1992 | Richman | 118/13 |

Primary Examiner—Steven Weinstein
Assistant Examiner—Anthony Weier
Attorney, Agent, or Firm—Vogt & O'Donnell

[57] ABSTRACT

Foodstuffs re coated with particulate material by transporting the foodstuff on a conveyor belt and supplying particulate material which is sieved, such as with a mesh belt or a pronged fork positioned above the conveyor belt, thereby passing particulate material to the foodstuff but retaining lumps of particulate material above a predetermined size and transporting the retained lumps away from and in a direction transverse to the conveyor belt.

4 Claims, 2 Drawing Sheets

FOODSTUFF COATING PROCESS

BACKGROUND OF THE INVENTION

The present invention relates to an apparatus and method of coating a foodstuff with a particulate material.

During the coating of foodstuffs such as frozen fish or ice cream with particulate crumb material, the crumbs tend to form lumps which affect the quality of the final coated product. All types of crumbs form lumps when exposed to moisture such as steam, batter drip or ice cream dip. In addition, deep-frozen crumbs form lumps when exposed to the environmental air temperature.

SUMMARY OF THE INVENTION

A food coating apparatus and method of separating lumps from particulate material and transporting them out of the apparatus without any contact with the foodstuff has now been devised.

The present invention provides an apparatus for coating a foodstuff with a particulate material comprising a conveyor belt for transporting the foodstuff, a supply means for the particulate material positioned above the conveyor belt and a sieving means positioned between the supply means and the conveyor belt capable of retaining any lumps of particulate material above a certain size while allowing the particulate material to pass through directly onto the conveyor belt for coating the foodstuff.

The present invention also provides a method for coating a foodstuff with a particulate material which comprises transporting a foodstuff on a conveyor belt having a longitudinal direction of travel and supplying particulate material from a supply means to a sieving means positioned above the conveyor belt so that particulate material passes to and coats the transported foodstuff and so that lumps of particulate material above a predetermined size are retained by and transported by the sieving means away from and in a direction transverse to the longitudinal direction of the conveyor belt.

Advantageously there is provided means for transporting the lumps out of the apparatus, preferably transversely to the direction of travel of the conveyor belt.

DETAILED DESCRIPTION OF THE INVENTION

One convenient sieving means comprises an endless wire mesh belt positioned transversely to the conveyor belt for transporting the foodstuff, whose upper run travels above and transversely to the upper run of the conveyor belt for transporting the foodstuff and whose lower run travels below either the upper run or the lower run of the conveyor belt for transporting the foodstuff so that the clumps are caught on the wire mesh belt and carried sideways from the apparatus.

Another convenient sieving means comprises a horizontal oscillating fork which oscillates transversely to the direction of travel of the conveyor belt for transporting the foodstuff so that the lumps are caught on the fork and carried sideways from the apparatus. Preferably, the prongs of the horizontal oscillating fork lie parallel to the longitudinal direction of travel of the conveyor belt for transporting the foodstuff. Advantageously, just before the reversal of direction, the oscillating fork rotates and passes through a vertical fixed fork for cleaning before rotating to its original position. Preferably, the prongs of the vertical fixed fork lie parallel to the conveyor belt for transporting the foodstuff.

In these sieving means of the present invention, the pitch of the meshes of the wire belt or the distance between the prongs of the oscillating fork are of a size to retain the lumps while allowing the particulate material to pass through e.g., from 2 to 15 mm. It goes without saying that if a foodstuff is on the conveyor belt, particulate material will fall onto the foodstuff.

The present invention is further illustrated by way of example only with reference to the accompanying drawings.

DETAILED DESCRIPTION OF THE DRAWINGS

Figure 1:
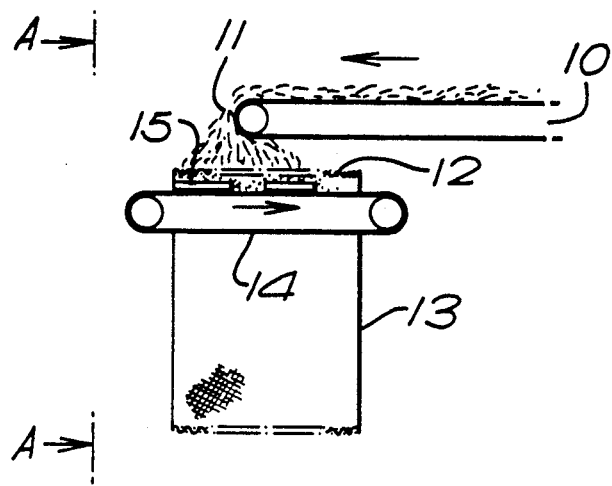
FIG. 1 represents a diagrammatic side sectional view of an apparatus wherein a transverse wire belt is used as the sieving means.
Figure 2:
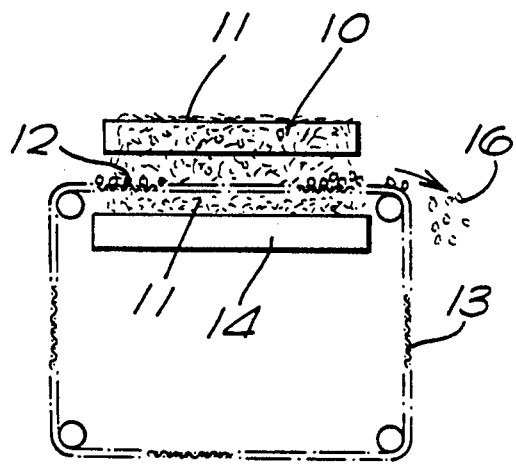
FIG. 2 represents a view of FIG. 1 looking in the direction of the arrows A—A.
Figure 3:
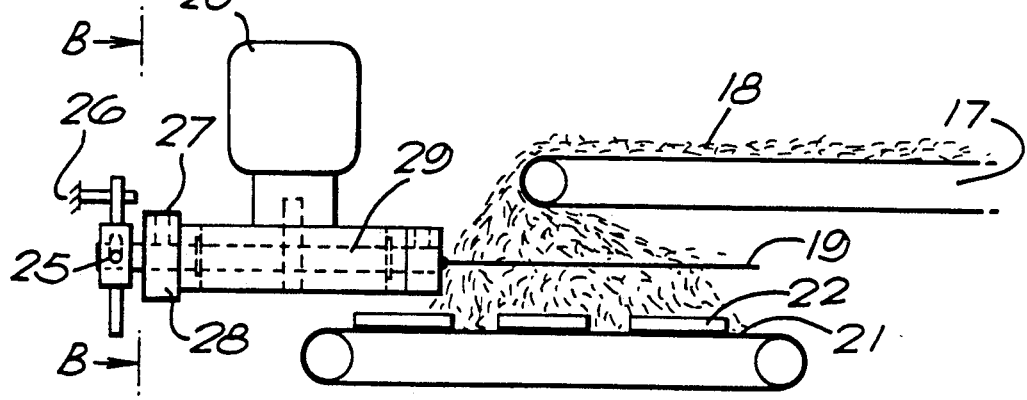
FIG. 3 represents a diagrammatic side sectional view of an apparatus wherein an oscillating fork is used as the sieving means.
Figure 4:
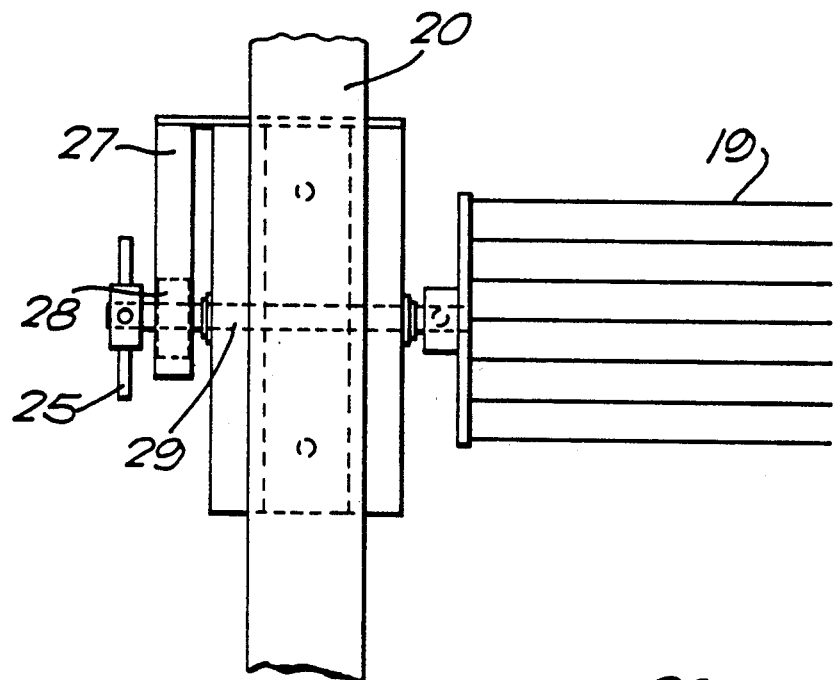
FIG. 4 represents a top plan view of FIG. 3 excluding the conveyor for the crumbs.
Figure 5:
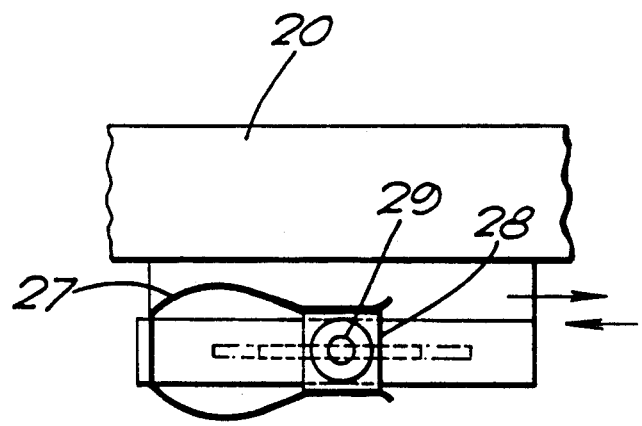
FIG. 5 represents a side view of FIG. 3 looking in the direction of the arrows B—B.

Referring to FIGS. 1 and 2 of the drawings the apparatus comprises a conveyor belt 10 transporting bread crumbs 11 which fall through the upper run 12 of transversely running endless wire mesh conveyor belt 13 onto the upper run of the conveyor belt 14 carrying frozen fish pieces 15. The size of the gaps in the meshes of conveyor belt 13 are small enough to retain any lumps 16 present in the bread crumbs and since it is travelling transversely the lumps are transported sideways out of the apparatus where they fall off of the belt and are collected.

Figure 6:
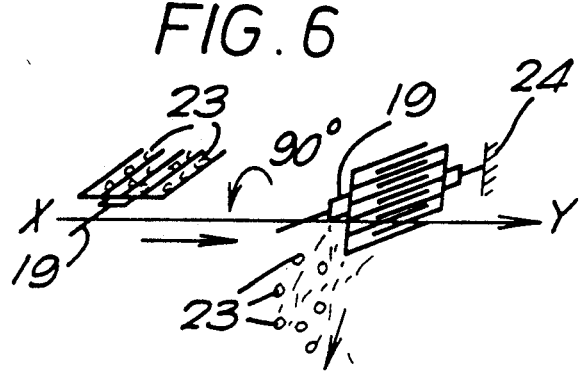
FIG. 6 represents a schematic view of the path of the oscillating fork.

Referring to FIGS. 3, 4, 5 and 6 of the drawings, the apparatus comprises a conveyor belt 17 transporting bread crumbs 18 which fall through the gaps between the prongs of a horizontally oscillating fork 19 driven by a pneumatic cylinder 20 to oscillate along a path indicated X-Y in FIG. 6 transversely to the direction of travel of a conveyor belt 21 carrying frozen fish pieces 22, the lumps 23 being retained by the prongs of the oscillating fork 19.

In FIG. 6, the oscillating fork 19 is travelling towards a fixed fork 24 at the end of the path Y and just before the reversal of direction of the oscillations the fork 19 rotates 90° by means of a turnstile 25 turned by a fixed pin 26 so that it passes lower side first through the fixed fork 24. The lumps 23 on the upper side of the oscillating fork 19 fall off and are collected, and the oscillating fork 19 rotates back to its original horizontal oscillating position whereupon it travels in the reverse direction along the path to the end X where another fixed fork is positioned, and the cleaning process is repeated. The oscillating fork 19 is prevented from rotating during its travel along the path between the ends X and Y by means of a plate spring 27 which prevents a dice 28 on the fork shaft 29 from turning.

I claim:

1. A process for coating a foodstuff with particulate material comprising:

transporting a foodstuff on a conveyor belt having a longitudinal direction of travel;

horizontally oscillating a pronged fork in a direction transverse to the longitudinal direction of travel of the conveyor belt, wherein the prongs of the fork have a distance therebetween which retains lumps of particulate material above a predetermined size; and supplying particulate material to the oscillated fork and allowing particulate material to pass through prongs of the fork to coat the transported foodstuff, the prongs of the oscillated fork retaining lumps of particulate material above predetermined size on the fork and transporting the retained lumps away from and in a direction transverse to the longitudinal direction of the conveyor belt.

2. A process according to claim 1 wherein the prongs of the fork have a distance therebetween which permits particulate material of from 2 mm to 15 mm to pass through the fork.

3. A process according to claim 1 further comprising rotating the oscillated fork and passing the prongs of the rotated fork through the prongs of a second fork to remove retained lumps from and clean the oscillated fork.

4. A process according to claim 1 wherein the particulate material is supplied to the oscillated fork by transporting the particulate material on a conveyor belt having an end positioned above the fork.

* * * * *